United States Patent
Perl (10) Patent No.: US 7,420,501 B2
(45) Date of Patent: Sep. 2, 2008

(54) METHOD AND SYSTEM FOR CORRELATING RADAR POSITION DATA WITH TARGET IDENTIFICATION DATA, AND DETERMINING TARGET POSITION USING ROUND TRIP DELAY DATA

(75) Inventor: Elyahu Perl, Dewitt, NY (US)

(73) Assignee: Sensis Corporation, East Syracuse, NY (US)

(*) Notice: Subject to any disclaimer, the term of this patent is extended or adjusted under 35 U.S.C. 154(b) by 0 days.

(21) Appl. No.: 11/673,120

(22) Filed: Feb. 9, 2007

(65) Prior Publication Data

US 2007/0222664 A1    Sep. 27, 2007

Related U.S. Application Data

(60) Provisional application No. 60/785,513, filed on Mar. 24, 2006, provisional application No. 60/801,011, filed on May 17, 2006.

(51) Int. Cl.
*G01S 13/42* (2006.01)

(52) U.S. Cl. ............................ 342/30; 342/32; 342/36; 342/37; 342/108; 342/145; 342/189

(58) Field of Classification Search ............. 342/29–40, 342/42, 46, 56, 107–109, 113, 133, 139, 342/140, 145–147, 189
See application file for complete search history.

(56) References Cited

U.S. PATENT DOCUMENTS

| | | | |
|---|---|---|---|
| 5,262,784 A * | 11/1993 | Drobnicki et al. ............. 342/45 |
| 5,596,326 A * | 1/1997 | Fitts ............................. 342/30 |
| 5,999,116 A * | 12/1999 | Evers ........................... 342/36 |
| 6,211,811 B1 | 4/2001 | Evers |
| 6,798,374 B1 * | 9/2004 | Smith ......................... 342/109 |
| 6,885,340 B2 * | 4/2005 | Smith et al. .................. 342/465 |
| 7,123,192 B2 * | 10/2006 | Smith et al. .................. 342/455 |
| 7,132,982 B2 | 11/2006 | Smith et al. |
| 2003/0142002 A1 | 7/2003 | Winner et al. |
| 2005/0007272 A1* | 1/2005 | Smith et al. .................. 342/189 |
| 2005/0035897 A1 | 2/2005 | Perl et al. |
| 2005/0140540 A1 | 6/2005 | Rees et al. |
| 2005/0255865 A1 | 11/2005 | Silllasto et al. |
| 2007/0222664 A1* | 9/2007 | Perl ............................. 342/29 |

FOREIGN PATENT DOCUMENTS

| JP | 02156183 A | * | 6/1990 |
|---|---|---|---|
| JP | 03092785 A | * | 4/1991 |

OTHER PUBLICATIONS

Herrero, Jesus Garcia et al., "ASDE and Multilateration Mode-S Data Fusion for Location and Identification on Airport Surface", Record of the 1999 IEEE Radar Conference, XP000895764, Apr. 20, 1999, pp. 315-320.

* cited by examiner

*Primary Examiner*—John B Sotomayor
(74) *Attorney, Agent, or Firm*—Burr & Brown (57) ABSTRACT

A method and system for using a single transceiver to correlate radar position data with target identification data. Two transceivers, operating in round trip delay mode, can be used to provide two possible positions for a given target when radar coverage is lost or unavailable. Three transceivers can be used to provide actual position of a given target using round trip delay data only.

32 Claims, 5 Drawing Sheets

METHOD AND SYSTEM FOR CORRELATING RADAR POSITION DATA WITH TARGET IDENTIFICATION DATA, AND DETERMINING TARGET POSITION USING ROUND TRIP DELAY DATA

CROSS REFERENCE TO RELATED APPLICATIONS

This application claims the benefit of U.S. Provisional Application No. 60/785,513, filed Mar. 24, 2006 and U.S. Provisional Application No. 60/801,011, filed May 17, 2006, the entireties of which are incorporated herein by reference.

FIELD OF THE INVENTION

The present invention relates to a method and system for correlating radar position data with target identification data, as well as a method and system for determining target position using round trip delay data.

BACKGROUND OF THE INVENTION

There are several known methods that can be used to provide localization data on surface targets. For example, a surface movement radar (SMR) will provide detection of all surface targets on the movement area of an airport. The radar technology used in an SMR is based on the transmission and reception of radio waves and reception of return echoes from all of the targets. A combination of the narrow beam antenna and highly precise measurement of the delay between transmission and reception allows an SMR to provide highly accurate position information on all of the detected targets. An SMR is called a non-cooperative sensor, because it does not require any cooperation from the target and will provide data on all the targets without any special equipment on the targets. This is one of the significant advantages of SMR, because some targets may be unwilling to cooperate in target detection.

Another method used to provide localization data on targets in a cooperative sense uses the signal generated from existing aircraft transponders, such as radio beacons, that most aircraft are mandated to carry. One example of this method used by secondary surveillance radars employs a ground station transceiver to interrogate an aircraft's Air Traffic Control Radar Beacon System (ATCRBS) or Mode S transponder and receive reply signals from the aircraft system. Another example of a cooperative method is the Automatic Dependent Surveillance-Broadcast (ADS-B) system, which listens to transponder initiated Mode S transmissions, or squits. Using either of these methods the ground station decodes information contained in the reply signals to determine the target's identity, call sign, altitude, code and/or mode, thereby uniquely identifying the aircraft. In addition, current ground transceivers, such as beacon sensors, can also perform highly accurate target localization using multilateration or similar methods.

A multilateration system provides good positional data as well as identification data providing an easier capability of accessing flight plan and other databases of related information. However, as an advanced surface movement and guidance control system (ASMGCS), a beacon sensor-based surface multilateration system requires the installation of multiple receivers and at least one transmitter scattered about the airport surface on carefully surveyed points, the installation of electrical power, communication links to a central processor and system optimization, and may also require installation of new access roads or improvement of existing access roads to service these sites. All of the aforementioned requirements drive up the cost of obtaining and maintaining an ASMGCS multilateration system.

Since an ASMGCS radar system will provide position data on all surface targets, not just transponder-equipped surface targets, many airports are opting to install ASMGCS radar equipment. While an ASMGCS radar system provides position data on all targets, an ASMGCS radar system does not provide any target identification data to facilitate interpretation of the surface movement picture and does not provide easy access to flight plan and other relevant data.

What is needed is a system that is less expensive than installing and maintaining a complete multilateration system that can augment the target position data from a radar system with the identification data that is available from a traditional multilateration system and thus provide easy access to flight plan and other data. The present invention provides such a system and method, both of which augment radar data with target identification data that is provided by one or more beacon transceivers.

SUMMARY OF THE INVENTION

It is the object of the present invention to provide a method and system that overcomes the problems of the prior art by providing a high quality surface picture, including target identification data, using radar and a minimum number of transceivers, such as radar beacon transceivers. The method of the present invention uses radar data as the main source for accurate target localization. One or more transceivers provide target identification data and facilitate access to flight plan and other relevant data. Multiple transceivers provide the capability to overcome line of sight problems and help resolve any target location ambiguities that may be present in high traffic density airport surface scenarios. In addition, the availability of multiple transceivers allows the system to locate targets if the radar malfunctions or stops working. Even when multiple transceivers are employed, however, the overall number is substantially less than what would be required in a traditional multilateration system.

It is one object of the present invention to augment the surface picture provided by an SMR with a single transceiver, such as a radar beacon transceiver. To this end, an embodiment of the present invention provides a method of (and system for) correlating radar position data with target identification data including the steps of using radar to determine the radar position data of a first target, transmitting a signal from a first transceiver of known location to a plurality of targets including the first target, and receiving reply signals at the first transceiver from the plurality of targets. Each reply signal includes identification data about the respective targets. The transmitted signal from the first transceiver and the reply signals are used to calculate a first round trip delay value for each of the plurality of targets, and the first round trip delay value for each target is then used to calculate the range of each target from the first transceiver. A first range window is established for each target relative to the first transceiver. The first range window is defined as an association range tolerance centered around the calculated range based on the first round trip delay value. The radar position data of the first target is then used to calculate the distance between the first target and the first transceiver, and the calculated distance is compared with the first range windows for the targets to select a first range window that encompasses the calculated distance. The identification data from the target that corresponds to the selected first range window is then correlated with the radar position data of the first target. One skilled in the art will readily understand that the preceding steps do not need to be carried out in the same sequence as described.

The method and system of the present invention as just described allows an airport that has a local radar capability to augment the radar position data with the target identification data that is typically available only from transceiver-based technologies, such as multilateration systems. As such, the airport can derive the identification-component value associated with transceiver-based systems without having to buy and maintain a multiple transceiver installation; one transceiver is all that is required to augment the radar.

Those skilled in the art will readily understand that the processing used to implement the method and system of the present invention as just described is largely carried out in accordance with traditional techniques. For example, the manner in which the radar determines radar position data for the targets is the same manner in which radars have been operating for quite some time. Similarly, the manner in which the first transceiver transmits signals to the targets and receives reply signals from the targets is also well-known. While the round trip delay, range and distance calculations, as well as the step of establishing the range windows can be performed by software resident on a computer in the transceiver, the same functionality could be performed by software running on a central processor that controls the overall method and system.

In a preferred embodiment, the first range window is selected to account for inaccuracies associated with measuring the range of a target from the first transceiver. In another preferred embodiment, if the central processor determines that a calculated distance is encompassed by more than one range window, the correlating step is delayed until such time that the comparing step results in only a single range window that encompasses a calculated distance.

In accordance with another embodiment, the correlated identification data and radar positions are communicated to an end user display (e.g., an air traffic control tower). In cases where the calculated distance is encompassed by more than one range window, before the correlated identification data and radar positions are communicated to the end user display, it is confirmed that the first target is located within a predetermined target movement area.

Any transceiver transmissions that are emitted by the targets can be used in the method and system of the present invention. For example, the signals can be ATCRBS, Mode-S and/or ADS-B, in which case the transceiver would be an ATCRBS, Mode-S or UAT transceiver, for example.

It is another object of the present invention to provide a backup surveillance capability for a radar-based coverage area where two or more transceivers are used. If the radar system fails, two or more transceivers can provide target position data by resolving target position ambiguities associated with the intersection of range circles by overlaying the positional data on the movement area of the airport and discarding overlap areas outside the movement area. Where the ambiguity persists, additional transceiver transmissions may be required to resolve the ambiguity, or radar data for all proximate targets can be used to resolve ambiguities.

To achieve this object, an embodiment of the present invention provides a method of (and system for) determining the position of a target including the steps of transmitting signals from first and second transceivers of known location to a plurality of targets, and receiving reply signals at the first and second transceivers from the plurality of targets, wherein each reply signal includes identification data about the respective target. The transmitted signals from the first and second transceivers and the reply signals are used to calculate first and second round trip delay values for each of the plurality of targets. The first and second round trip delay values for each target are used to calculate the range of each target from the first and second transceivers, respectively. In the same manner described above, first and second range windows are established for each target relative to the first and second transceivers, respectively. Target reply signals received at the first transceiver are clustered with target reply signals received at the second transceiver based on target identification data contained in each reply signal. The areas where the first and second range windows for each target overlap one another are then determined and compared with predetermined target movement area data to determine the identity and location of each target within the predetermined movement area. Again, one skilled in the art will readily understand that the preceding steps do not need to be carried out in the same sequence as described.

The method of the invention as just described provides two possible positions for any given target. Instead of (or in addition to) comparing those positions to predetermined target movement area, radar data can be compared to the two possible positions to derive the true position for a given target.

Yet another object of the present invention is to determine target position using round trip delay data collected at three transceivers. An embodiment of the invention along this line provides a method of (and system for) determining the position of a target including the steps of transmitting a signal from first, second and third transceivers of known location to a plurality of targets, receiving reply signals at the transceivers from the plurality of targets, each reply signal including identification data about the respective target, using the transmitted signal from the first, second and third transceivers and the reply signals to calculate first, second and third round trip delay values for each of the plurality of targets, and then using the first, second and third round trip delay values for each target to calculate the range of each target from the first, second and third transceivers, respectively. In the same manner described above, first, second and third range windows are established for each target relative to the first, second and third transceivers, target reply signals received at the first, second and third transceivers are clustered based on target identification data contained in each reply signal, and then areas where the first, second and third range windows for each target overlap one another are determined to thereby provide the location of each target relative to the transceivers. Again, one skilled in the art will readily understand that the preceding steps do not need to be carried out in the same sequence as described.

The method of the invention as just described uses round trip delay data to determine the position of each target relative to the three transceivers. This differs from and is significantly less complex compared to traditional multilateration techniques, which rely upon substantially more transceivers and sophisticated algorithms to carry out DTOA calculations.

The present invention provides a method for a single transceiver, located proximate an airport movement area, to validate an estimated position of a target having a valid target track when radar data becomes unavailable, comprising the steps of: estimating a position for the target based on course and speed attributes of the target and the most recent known target position; transmitting a signal from a first transceiver of known location to the target; receiving reply signals at the first transceiver from the target, each reply signal including identification data about the target; using the transmitted signal from the first transceiver and the reply signals to calculate a round trip delay value for the target; using the round trip delay value for the target to calculate a range of the target from the first transceiver; establishing a range association window for the target relative to the first transceiver, the range association window being defined as a range tolerance centered around the calculated range based on the round trip delay value; overlaying the range association window for the target on a map of the airport movement area; determining at least one target position where the range association window for the target intersects a valid location on the airport movement area; correlating the estimated position of the target with the at least one determined target position to confirm that the estimated position correlates with one of the at least one determined target position; and validating the estimated position of the target only when the estimated position correlates with one of the at least one determined target position.

In one embodiment of the present invention, the method for a single transceiver to validate an estimated position of a target includes the step of updating the target track with the validated position of the target. In another embodiment, the method further includes the step of communicating the validated position of the target to an end user display.

BRIEF DESCRIPTION OF THE DRAWINGS

For a fuller understanding of the nature and objects of the invention, reference should be made to the following detailed description of preferred modes of practicing the invention, read in connection with the accompanying drawings in which.

DETAILED DESCRIPTION OF THE INVENTION

Figure 1:
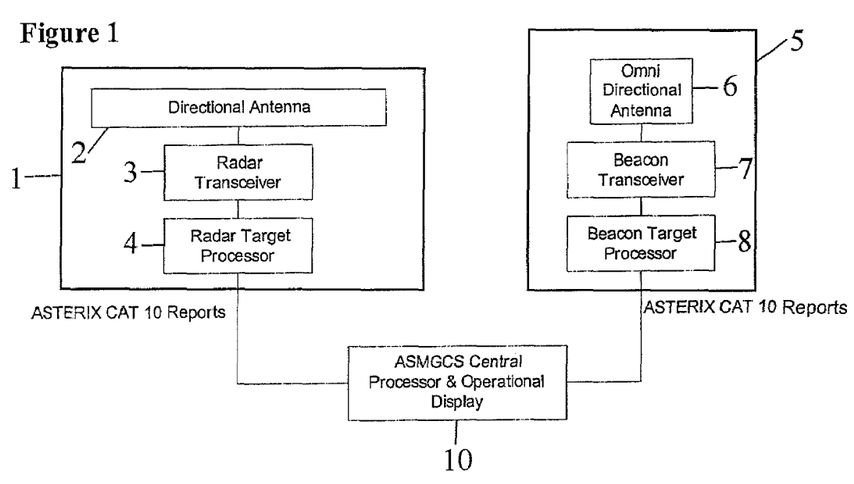
FIG. 1 is a general block diagram of a system in accordance with one embodiment of the invention.

One embodiment of the method and system of the present invention includes an SMR and a single cooperative sensor. FIG. 1 shows a general block diagram of this embodiment, wherein the equipment configuration includes an SMR 1, a beacon sensor 5, a system central processor 10 and means for communicating between these components. The SMR 1 includes a directional antenna 2, a radar transceiver 3 and a radar target processor 4. The beacon sensor 5 includes an omni-directional antenna 6, a beacon transceiver 7 and a target processor 8. The omni-directional antenna 6 is located near the target area, for example, the airport surface movement area. For cost considerations, co-locating the beacon sensor 5 with the SMR 1 is preferable, but not required. The means for communicating may include a hardwired communications interface or a wireless communications link, such as a datalink, for example.

The SMR radar transceiver 3 sends radar video data to the radar target processor 4, which detects and tracks targets and sends reports to the central processor 10 automatically. The SMR radar target processor 4 calculates a two-dimensional target location (i.e., x, y coordinates) for each target. The radar target reports sent by the radar target processor 4 are usually in ASTERIX Category 10, a standard format known in the art, but any format can be used in the embodiments described herein. The central processor 10 receives the radar target report data and calculates the distance from each target's radar position to the beacon sensor 5 from the known location of the SMR 1 and the known location of the beacon sensor 5.

The beacon transceiver 7 transmits a signal in an ATCRBS and/or Mode S All Call operating mode, for example, to interrogate the targets. The beacon transceiver 7 begins interrogating targets that are proximate to the beacon sensor 5 using the Air Traffic Control Radar Beacon Systems (ATCRBS) mode or Mode S All Call. Each suitably equipped target that is within receiving range of the beacon signal will reply to the beacon interrogation. The ATCRBS or Mode S reply message from each target will contain unique target identifying information, including target mode and code information. In addition, a beacon transceiver may also listen to the Automatic Dependent Surveillance-Broadcast (ADS-B) Mode S transmissions, or squits, which are initiated by Mode S equipped aircraft about every second and contain position data.

Since an omni-directional antenna 6 is used by the beacon sensor 5, only range data can be calculated from the round trip delay between the beacon transceiver's interrogation signal transmission and the reception of the target reply signal. This calculated range data extends through 360 degrees in azimuth around the beacon sensor 5. The beacon target processor 8 clusters the received target replies using unique code information and other attributes available in the replies. Beacon targets are reported to the central processor 10, as shown in FIG. 1. Like the radar data, while the ASTERIX CAT-10 is one standardized format that can be used for the beacon data, any other format could be used. The ASTERIX CAT-10 format may include additional track data, which could be used to help the correlation process, but is not an essential part of the present invention. The available data sent to the central processor 10 in this embodiment includes range, mode, code and target height, which is available from Mode C interrogations.

Figure 2:
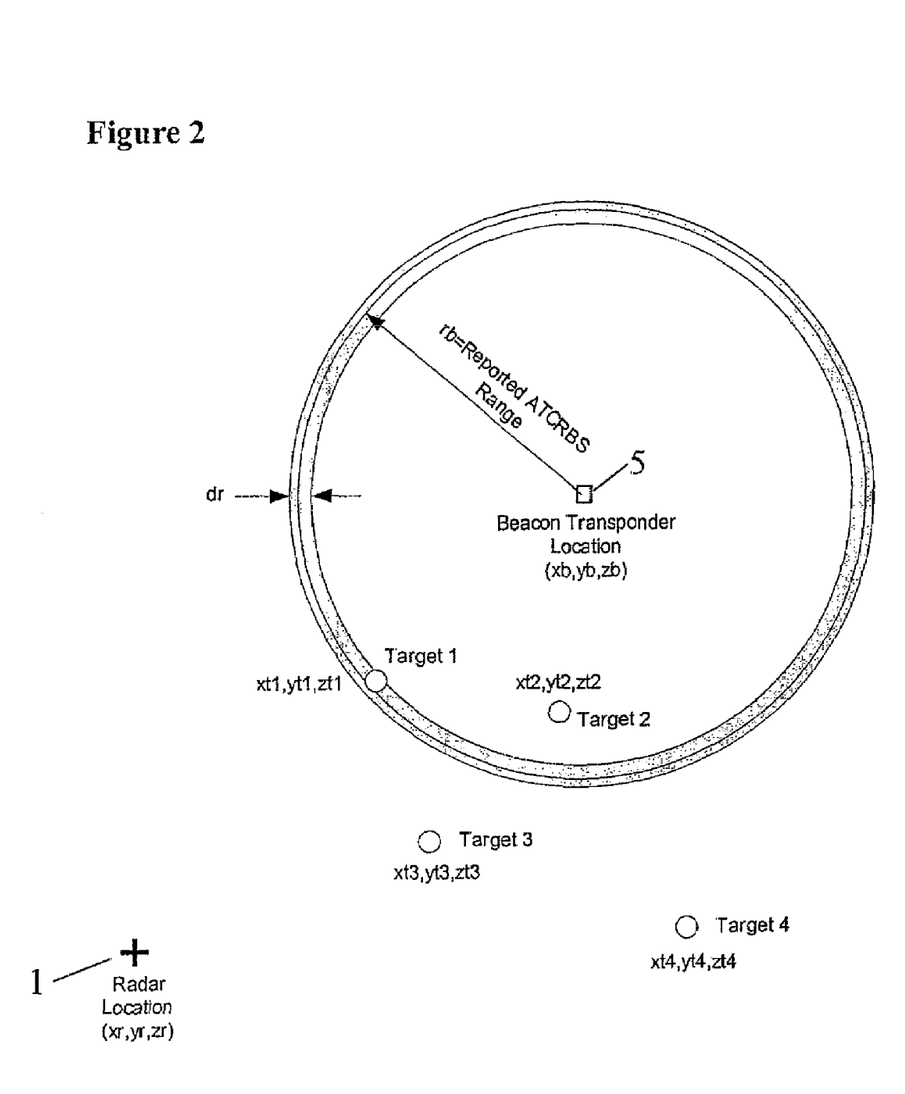
FIG. 2 shows the interaction between a radar and one transceiver in accordance with one embodiment of the invention.

FIG. 2 depicts a scenario including SMR radar position data for multiple targets (Targets 1-4) and the range data (rb) determined by processing an interrogation signal transmitted from beacon sensor 5 and the associated reply signal for target 1. In FIG. 2, the location of beacon sensor 5 is shown at the origin of a circle drawn around the sensor. If other Cartesian coordinate systems are used, it is always possible to shift the coordinate system to a configuration shown in FIG. 2 without affecting the generality. The SMR radar reports the two-dimensional coordinates of the targets x, y. The height of the targets, z, is assumed to be Mode C height or surface height, if mode C is not available.

The following table shows the target coordinates of FIG. 2.

| Target # | Coordinates |
|---|---|
| Radar target 1 | $x1, y1, z1$ |
| Radar target 2 | $x2, y2, z2$ |
| Radar target 3 | $x3, y3, z3$ |
| Radar target 4 | $x4, y4, z4$ |
| Beacon target | Rb |

The central processor 10 calculates a round trip delay (RTD) value from the time of transmission of the signal from the beacon sensor 5 and the time of receipt of the reply signals from the targets. The time of transmission of the interrogation signal from the beacon sensor 5 and the time of receipt of the reply signal are known, measured values. The time delay associated with processing the interrogation signal from the beacon sensor 5 within the aircraft system is a known constant. An RTD time value is calculated for each interrogation/reply signal sequence for each target. The central processor 10 calculates a range value for each target from the known location of the beacon sensor 5 using the calculated round trip delay (RTD) value (i.e., multiplying the RTD value by the speed of light and dividing by 2 calculates the target's range from the beacon sensor 5).

FIG. 2 depicts four SMR radar targets and illustrates the target range window methodology of the present invention. The target range window methodology is performed on all of the radar targets. Specifically, the RTD-based range calculated from the RTD value for target 1 is depicted as the circular line at distance "rb" from the known location of the beacon sensor 5. Based on the established acceptable beacon transponder equipment processing delay tolerances and biases, a range window "dr" is established in a centered fashion around the calculated range. Specifically, the range window, dr, is ring shaped and is centered around a radius equal to the calculated range (rb). The range window, dr, extends through 360 degrees in azimuth, but is confined to a very narrow range extent dictated by the ATCRBS or Mode S range accuracy. A calculated range and range window are determined for each target RTD time value. In one embodiment of the present invention, the range window is a fixed percentage of the total calculated distance (based on RTD).

As explained above, the central processor 10 has calculated the distance between the beacon sensor 5 and each target using the position data provided by the radar. More specifically, the system of the present invention uses the established radar track data to calculate the expected range of each of the plurality of targets to the beacon sensor 5. The coordinates of the beacon sensor 5 and radar 1 are determined by a careful survey of the site during the sensor and radar installations. The distance of the radar targets from the beacon sensor 5 location can be calculated by the central processor 10, because the positions of both the beacon sensor 5 and radar 1 are known. Radar data for a target may be provided as a bearing and range or azimuth and elevation from the radar location, or in earth coordinates. Ordinarily SMR data includes range and azimuth only. Height data may be available from Mode C replies, and in the event that it is not height is assumed to be average surface height. In the notation used here the coordinates of the beacon sensor 5 are (xb,yb,zb). The calculated distance from each radar target's position to the beacon sensor 5 is calculated according to the following equation (1):

$$r_i = \sqrt{(x_i - xb)^2 + (y_i - yb)^2 + (z_i - zb)^2} \quad (1)$$

The index i denotes the target number.

The central processor 10 compares the calculated distance from each radar target to the beacon sensor from equation (1) to the calculated RTD-based range of each target to the beacon sensor and its range window to determine if the calculated radar-based distance of a target from the beacon sensor is within a range window for a target. If this calculated range falls within an established range window, dr, and only one target is within the range window, then an unambiguous association between the radar position data and the beacon sensor data for a target is established. As depicted in FIG. 2, the radar position data for Target 1 falls within the range window for Target 1, and Target 1 is the only target that meets the range association criterion. Therefore, a beacon sensor-radar association will be declared for target 1.

Once a radar target has been unambiguously associated to a beacon target, the target can be tracked using the radar and no more ATCRBS or Mode S All Call interrogations are required for that target. The radar target now contains all of the identity attributes of the beacon target. The final output to the operator in this case is indistinguishable from a full multilateration beacon system because the accuracy of the radar track is high and all beacon target attributes exist. In addition, Automatic Dependent surveillance-Broadcast (ADS-B) Mode S squitter messages, or squits, can now be correlated with the radar data based on the available unique target information such as tail number or N-number. The ASMGCS can now use the radar to determine high accuracy position, and the beacon data to get target identifying and operational information.

Figure 3:
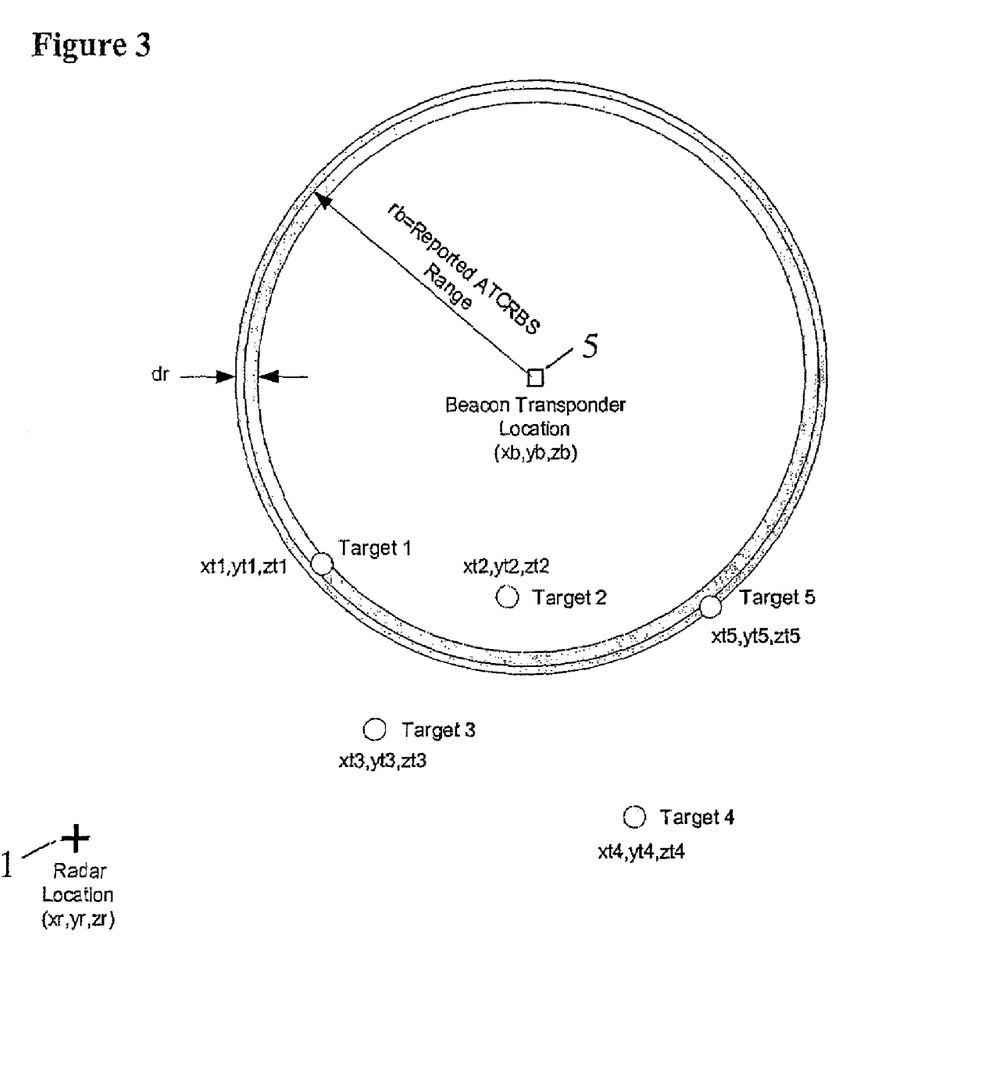
FIG. 3 is a similar view to FIG. 2, where the range window for a first target is coincident with the range window for a second target.

Due to the high accuracy of the calculated RTD-based range data, the range window, dr, is narrow and the probability of multiple targets falling within a single range window is low. However, in dense target environments or situations in which targets are grouped, such as waiting for takeoff, the range windows for more than one target may be coincident. FIG. 3 illustrates a case where two targets, target 1 and target 5, have range windows that are coincident. In this situation, the central processor 10 marks both targets as unknown and does not associate either target. The method is subsequently repeated until the physical situation changes (i.e., only one target exists within each range window) and an unambiguous association can be established.

Range data calculated from round trip delay using ATCRBS or Mode S has a transponder dependent bias. Typically the transponder's internal time delay needs to be adjusted to operate within the timing tolerances specified by international standards. With the present invention, after an association between radar data and beacon data for a particular target has been established, the location of the target is known from radar data and the central processor can calculate the transponder dependent bias of the target's transponder. The central processor 10 can then store the calculated transponder dependent bias and use it to remove the transponder dependent bias in subsequent calculations for the particular target.

If at any point the track is lost the system re-acquires the target by initiating a Mode S or ATCRBS interrogation transmission and repeating the process described.

Another aspect of the present invention provides a method for a single transceiver in an airport surface movement guidance system comprising a single transceiver and radar, to validate an estimated position of a target having a valid target track when radar fails or radar data becomes unavailable. The central processor receives data from the single transceiver and computes an estimated position, or coast position, for the target based on the course and speed attributes of the target and the most recent known target position.

An embodiment of the present invention provides a method for a single transceiver, located proximate an airport movement area, to validate an estimated position of a target having a valid target track when radar data becomes unavailable, comprising the steps of: estimating a position for the target based on course and speed attributes of the target and the most recent known target position; transmitting a signal from a first transceiver of known location to the target; receiving reply signals at the first transceiver from the target, each reply signal including identification data about the target; using the transmitted signal from the first transceiver and the reply signals to calculate a round trip delay value for the target;

using the round trip delay value for the target to calculate a range of the target from the first transceiver; establishing a range association window for the target relative to the first transceiver, the range association window being defined as a range tolerance centered around the calculated range based on the round trip delay value; overlaying the range association window for the target on a map of the airport movement area; determining at least one target position where the range association window for the target intersects a valid location on the airport movement area; correlating the estimated position of the target with the at least one determined target position to confirm that the estimated position correlates with one of the at least one determined target position; and validating the estimated position of the target only when the estimated position correlates with one of the at least one determined target position.

The reply transmissions from the target provide the target's current course and speed attributes of the target are contained in the reply transmissions from the target and are then used by the method of the present invention to compute the estimated position of the target. Examples of valid locations for a target position on the airport movement area include runways and taxiways, for example.

In the method of the present invention, the range association window established for a target may intersect one or more valid locations on the airport movement area. Where the range association window intersects only one valid location on the airport movement area, the target position determined from the range association window is clear and unambiguous. However, where the range association window intersects two or more valid locations on the airport movement area, the target position determined from the range association window is ambiguous. The present invention resolves target position ambiguity by correlating the estimated target position with the target positions determined from the range association window in the correlating step. The estimated target position will only correlate with one target position determined from the range association window.

In one embodiment of the present invention, where the estimated position of the target is validated, the method further includes the step of updating the target track with the validated position of the target. The method of the present invention enables the airport surface movement guidance system to update existing target tracks on the airport surface movement area when radar has failed or is otherwise unavailable, thereby providing the best quality data available to the controllers. In another embodiment, the method further includes the step of communicating the validated position of the target to an end user display.

In one embodiment of the present invention, the central processor 10 calculates the absolute value of the distance between the calculated range from equation (1) for each target and the range reported beacon range as shown in equation (2):

$$r\_diff_i = |r_i - rb| \quad (2)$$

Here, again, the index i denotes the target number.

Equation (2) shows the absolute value of the difference between the distances calculated from the radar data and the reported beacon range. In this embodiment, the association of radar data and beacon sensor data will be declared only if the absolute difference calculated by equation (2) is within a range association window, dr, for a target and this is the only target that is within the range association window. Note that the association of radar data and beacon data will only be declared where this is the only target that meets the range window association criterion. The value of the range window, dr, is proportional to the expected accuracy of the beacon sensor, radar sensor and survey data.

Figure 4:
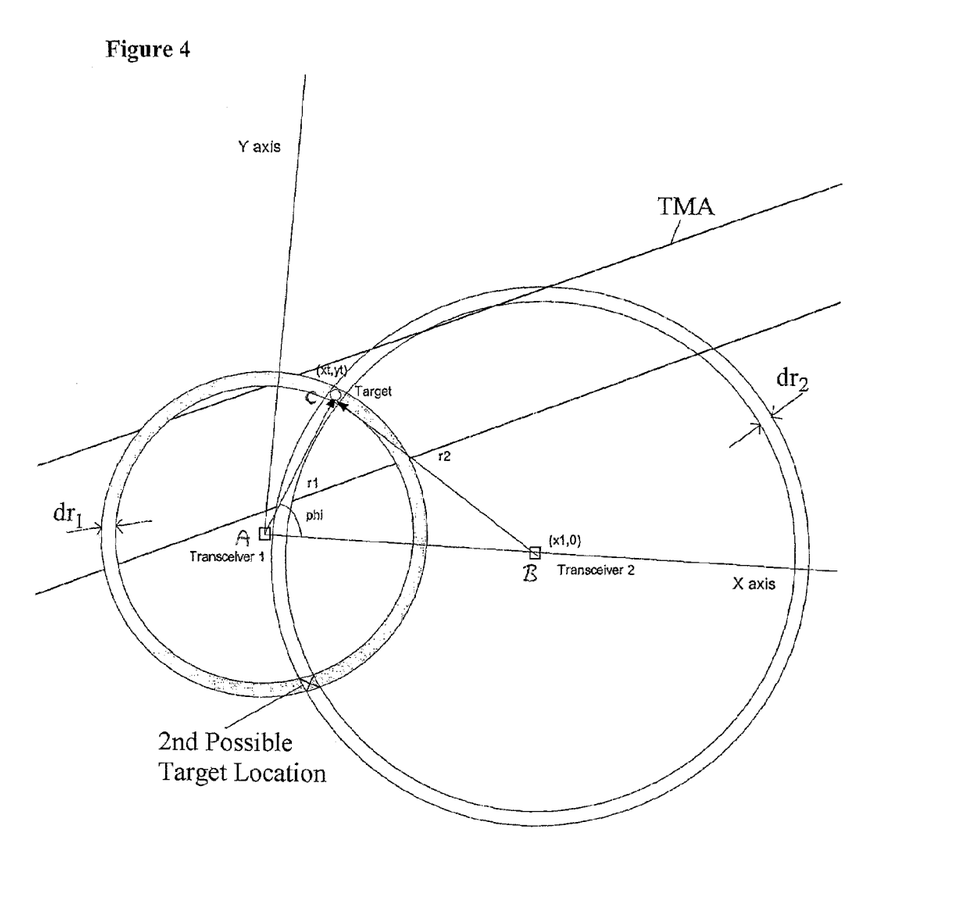
FIG. 4 shows the interaction between two transceivers in accordance with another embodiment of the present invention.

Another embodiment of the present invention relates to improving the performance of a transceiver, such as a beacon sensor, in high-density environments by using two transceivers, with each of the transceivers transmitting signals and receiving replies from which a round trip delay value is calculated. FIG. 4 shows a method of locating a target using two transceivers. Here, the range to the target from each of the transceivers is calculated by multiplying the round trip delay value for a transceiver by the speed of light and dividing by 2. As shown in FIG. 4, the ranges to the target from the first transceiver 1 and the second transceiver 2 are marked as r1 and r2, respectively. The target location is calculated by solving the equation for two intersecting circles. For example, transceiver 1 is shown in the origin of the x-y plane in FIG. 4 and transceiver 2 is shown on the X-axis, coordinates (x1,0). This convention is still general as any Cartesian coordinate system can always be shifted and rotated to represent the two transceivers as shown. Transceiver 1, transceiver 2 and the target form the end points for triangle A-B-C. The following equations show the solution to the target location in this method.

Triangle A-B-C is solved according to the cosine theorem. All three sides of the triangle are known; r1 and r2 are calculated from the round trip delays and the length of the third side, x1, is the known distance between the surveyed locations of transceiver 1 and transceiver 2. According to the cosine theorem the cosine of the angle phi is given by:

$$\cos(phi) = \frac{r1^2 - r2^2 + x1^2}{2 \cdot r1 \cdot x1} \quad (3)$$

This method results in two possible locations for the target, as shown in FIG. 4. Since only one of the solutions is valid, there is target location ambiguity. In one embodiment of the present invention, to resolve the target location ambiguity, the central processor compares each of the possible location solutions to a defined surface target movement area (TMA) and rejects one of the solutions based on its location not falling within the defined surface target movement area (e.g., an airport runway). In most cases, it is very unlikely that both possible location solutions will be at valid locations on the defined surface target movement area. For the case where both possible location solutions fall on valid locations on the defined airport surface target movement area, each of the transceivers will schedule additional transmissions until the ambiguity no longer exists. For example, the additional transceiver's transmissions are interrogation/reply signal sequences for each target in the area. Target coordinates xt, yt are calculated as follows:

$$xt = r1 \cdot \cos(phi)$$

$$yt = r1 \cdot \sin(phi) \quad (4)$$

Finally, the coordinates shown in equation (4) are shifted and rotated such that xt and yt are expressed in terms of the global coordinates. In this case, there are two variables and two independent equations, from which unique solutions can be derived. It should be noted that location solutions without shifting the coordinate system are also mathematically possible.

The methodology depicted in FIG. 4 requires the replies received at transceiver 1 to be clustered with replies received at transceiver 2. As in standard multilateration systems, the replies can be clustered based on the identification data contained in the reply message formats (e.g., Mode S address). Another possibility is to cluster the replies based on the range of each target from transceiver 1 and transceiver 2. This is possible because the precise location of the two transceivers is known.

As the method depicted in FIG. 4 provides two possible positions for the target, radar data for each target can be used instead of (or in addition to) surface target movement area data to determine the true position for each target. Additionally, FIG. 4 shows that, in the method of the invention wherein two transceivers are employed, first and second range windows ($dr_1$, $dr_2$) are established for each target relative to the first and second transceivers. As explained above, these range windows are tolerances that account for inaccuracies associated with measuring the range of the targets from the transceivers.

Figure 5:
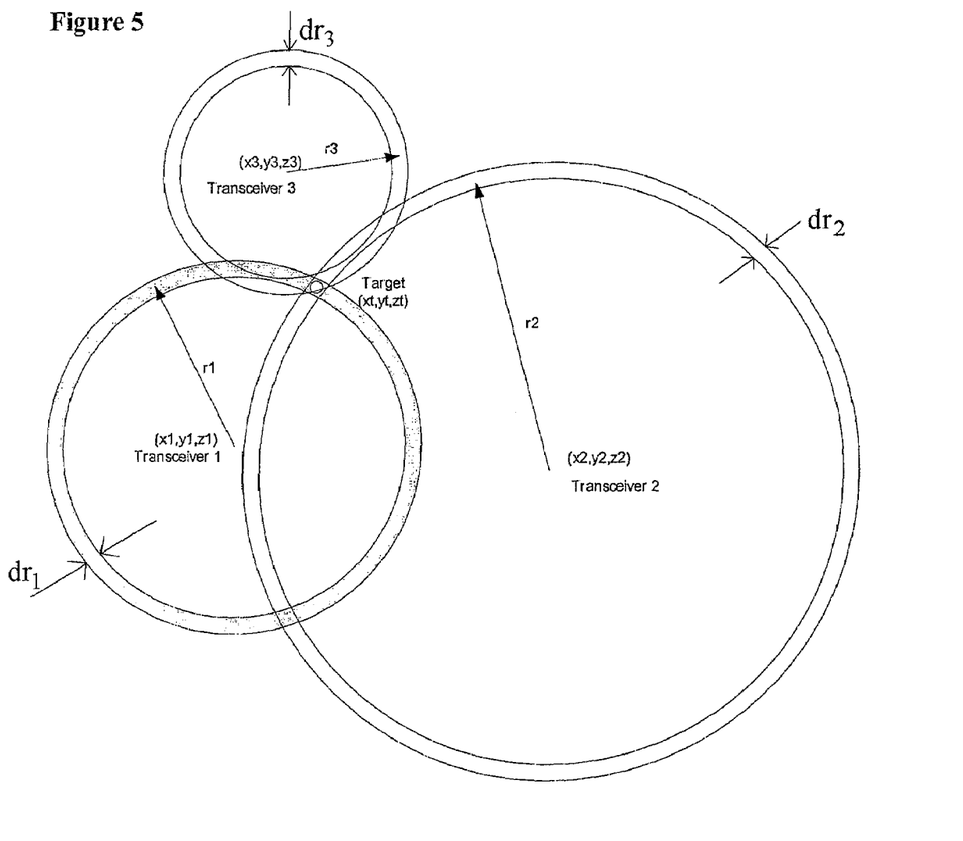
FIG. 5 shows the interaction between three transceivers in accordance with yet another embodiment of the present invention.

Another embodiment of the present invention uses three transceivers to determine a target's location as shown in FIG. 5. In one embodiment an estimation algorithm is used to determine the target location. In this situation, a three-dimensional solution for target location is possible with target height estimated from the data. FIG. 5 depicts a two-dimensional projection of a target location solution using three or more transceivers. First, an initial solution of the target location coordinates can be determined analytically by using data for two of the transceivers as described above. Second, the central processor calculates the target's location for every combination of two transceivers of the three or more transceivers forming the system. Third, the central processor averages the resulting target locations. Fourth, each of the target location results are individually compared to one or more defined system parameters and are rejected where the target location result exceeds one or more of the defined system parameters. For example, the central processor computes a mean value for the target location results and compares each of the target location results to the computed mean value and rejects each target location result that exceeds the computed mean value. Fifth, the central processor recalculates the average for the target location results, without the rejected target locations. This recalculated average of the target location results is the initial location of the target.

Sixth, a three-dimensional search volume is opened around the initial location of the target and each point in this search volume is a potential target location. Here, the range to each transceiver is calculated using the following equations:

$$(xt_i - x1)^2 + (yt_i - y1)^2 + (zt_i - z1)^2 = r1_i^2$$

$$(xt_i - xn)^2 + (yt_i - yn)^2 + (zt_i - zn)^2 = rn_i^2 \quad (5)$$

Where:

x1, y1, z1, ... xn, yn, zn are the locations of the transceivers $xt_i$, $yt_i$, $zt_i$ ... are the assumed location of the target in the search volume, iteration i $rn_i$ are the calculated ranges to transceiver n in iteration i.

Again, if height data is not available from Mode C replies, it is assumed to be average surface height.

Next, a cost function is calculated based on the calculated ranges of equation (5) and the actual range measurements using the following equation:

$$cost_i = \sum_{n=1}^{N} (rn_i^2 - rmeasured_n^2)^2 \quad (6)$$

Where:

$rn_i$ are the calculated ranges of equation (5).

rmeasured are the measured ranges to each transceiver.

Similar cost functions are possible, such as the difference between absolute values of the distances instead of the difference of the squares of the distances.

The cost function is calculated for each point in the search volume. Equation (6) calculates the sum of the squares of the errors of the expected ranges calculated in iteration i relative to the measured ranges. The selected target location solution is the one that has the lowest cost. For computational efficiency other methods known in the art, including steepest gradient descent, are employed, depending on the computational resources available and the accuracy of the initial solution.

As is the case with the other embodiments, FIG. 5 shows that range windows ($dr_1$, $dr_2$, $dr_3$) are established for each target with respect to each transceiver.

The present invention provides a cost-effective approach for correlating target identification with radar data without having to bear the expense of buying and maintaining a complete multilateration system (i.e., a single transceiver is sufficient). In addition, embodiments of the present invention that utilize two or more transceivers can provide a standalone surface target location capability for situations where an SMR or other radar has failed. While the two-transceiver approach of the present invention provides two possible target location solutions, predetermined surface movement area data and/or radar can be used to detect the true position of the target. Embodiments of the present invention that utilize three or more transceivers, while more expensive, provide unambiguous target position data because the potential target position ambiguities of the two-transceiver approach are resolved by using the third transceiver. And, as the target processing relies on RTD data only, it is significantly less complex than standard multilateration systems.

While the present invention has been particularly shown and described with reference to preferred embodiments, it will be understood by one skilled in the art that various changes in detail may be effected therein without departing from the spirit and scope of the invention as defined by the claims.

I claim:

1. A method of correlating radar position data with target identification data comprising the steps of:

using radar to determine radar position data of a first target;

transmitting a signal from a first transceiver of known location to a plurality of targets, including the first target;

receiving reply signals at the first transceiver from the plurality of targets, each reply signal including identification data about the respective target;

using the transmitted signal from the first transceiver and the reply signals to calculate a first round trip delay value for each of the plurality of targets;

using the first round trip delay value for each target to calculate a range of each target from the first transceiver;

establishing a first range window for each target relative to the first transceiver, said first range window being defined as a range tolerance centered around the calculated range based on the first round trip delay value;
using the radar position data of the first target to calculate a distance between the first target and the first transceiver;
comparing the calculated distance with the first range windows for the targets to select a first range window that encompasses the calculated distance; and
correlating the identification data from the target that corresponds to the selected first range window with the radar position data of the first target.

2. The method of claim 1, further comprising the step of determining during the comparing step that a calculated distance is encompassed by more than one range window, and then delaying the correlating step until such time that the comparing step results in only a single range window that encompasses a calculated distance.

3. The method of claim 1, further comprising the step of:
computing an absolute value of the difference between the distances calculated from the radar data and the transceiver round trip delay;
performing the correlating step only when the calculated absolute value of the difference between the distances is within the range window.

4. The method of claim 1, further comprising the step of communicating the correlated identification data and radar positions to an end user display.

5. The method of claim 4, further comprising, prior to the communicating step, confirming that the first target is located within a predetermined target movement area.

6. The method of claim 1, wherein the signal is an ATCRBS signal.

7. The method of claim 1, wherein the signal is a Mode S signal.

8. The method of claim 1, wherein the signal is an ADS-B signal.

9. The method of claim 1, wherein the width of the range window is selected to account for inaccuracies associated with measuring the range of a target from the first transceiver.

10. A method of determining position of a target, comprising the steps of:
transmitting a signal from a first transceiver of known location to a plurality of targets;
receiving reply signals at the first transceiver from the plurality of targets, each reply signal including identification data about the respective target;
using the transmitted signal from the first transceiver and the reply signals to calculate a first round trip delay value for each of the plurality of targets;
using the first round trip delay value for each target to calculate a range of each target from the first transceiver;
establishing a first range window for each target relative to the first transceiver, said first range window being defined as a range tolerance centered around a calculated range based on the first round trip delay value;
transmitting a signal from a second transceiver of known location to the plurality of targets;
receiving reply signals at the second transceiver from the plurality of targets, each reply signal including identification data about the respective target;
using the transmitted signal from the second transceiver and the reply signals to calculate a second round trip delay value for each of the plurality of targets;
using the second round trip delay value for each target to calculate a range of each target from the second transceiver;
establishing a second range window for each target relative to the second transceiver;
clustering target reply signals received at the first transceiver with target reply signals received at the second transceiver; and
determining two possible positions for each target based on the areas where the first and second range windows for each target overlap one another.

11. The method of claim 10, further comprising the steps of:
using radar position data for each target to determine which overlap area contains the radar position of the target; and
selecting the target position where the overlap area contains the radar position of the target.

12. The method of claim 10, wherein the range tolerance used for the second range window is substantially equal in magnitude to the range tolerance of the first range window.

13. The method of claim 10, wherein target reply signals are clustered using the calculated range of each target from the first and second transceivers.

14. The method of claim 10, wherein target reply signals and clustered using target identification data contained in each reply signal.

15. The method of claim 10, wherein the signals are at least one of ATCRBS, Mode-S and ADS-B signals.

16. A method of determining position of a target, comprising the steps of:
transmitting a signal from a first transceiver of known location to a plurality of targets;
receiving reply signals at the first transceiver from the plurality of targets, each reply signal including identification data about the respective target;
using the transmitted signal from the first transceiver and the reply signals to calculate a first round trip delay value for each of the plurality of targets;
using the first round trip delay value for each target to calculate the range of each target from the first transceiver;
establishing a first range window for each target relative to the first transceiver, said first range window being defined as a range tolerance centered around the calculated range based on the first round trip delay value;
transmitting a signal from a second transceiver of known location to the plurality of targets;
receiving reply signals at the second transceiver from the plurality of targets, each reply signal including identification data about the respective target;
using the transmitted signal from the second transceiver and the reply signals to calculate a second round trip delay value for each of the plurality of targets;
using the second round trip delay value for each target to calculate the range of each target from the second transceiver;
establishing a second range window for each target relative to the second transceiver, said second range window being defined as a range tolerance centered around the calculated range based on the second round trip delay value;
clustering target reply signals received at the first transceiver with target reply signals received at the second transceiver;
determining areas where the first and second range windows for each target overlap one another; and
comparing the areas of overlap with predetermined target movement area data to determine the identity and location of each target within the predetermined target movement area.

17. The method of claim 16, further comprising the step of determining during the comparing step that more than one target is encompassed by the areas of overlap for a single target within the predetermined target movement area, and then delaying the determination of target location until only a single target is encompassed by said areas of overlap within the predetermined target movement area.

18. The method of claim 17, further comprising the step of using target position data from a radar to resolve target location ambiguity where more than one target is encompassed by the areas of overlap for a single target within the predetermined target movement area.

19. The method of claim 16, wherein target reply signals are clustered using the calculated range of each target from the first and second transceivers.

20. The method of claim 16, wherein target reply signals are clustered using the target identification data contained in each reply signal.

21. The method of claim 16, wherein the signals are at least one of ATCRBS, Mode-S and ADS-B signals.

22. A method of determining position of a target, comprising the steps of:
    transmitting a signal from first, second and third transceivers of known location to a plurality of targets;
    receiving reply signals at the transceivers from the plurality of targets, each reply signal including identification data about the respective target;
    using the transmitted signal from the first, second and third transceivers and the reply signals to calculate first, second and third round trip delay values for each of the plurality of targets;
    using the first, second and third round trip delay values for each target to calculate a range of each target from the first, second and third transceivers, respectively;
    establishing first, second and third range windows for each target relative to the first, second and third transceivers, respectively, the first, second and third range windows being defined as range tolerances centered around the calculated ranges based on the first, second and third round trip delay values, respectively;
    clustering target reply signals received at the first, second and third transceivers based on target identification data contained in each reply signal; and
    determining areas where the first, second and third range windows for each target overlap one another to thereby determine the position of each target relative to the transceivers.

23. The method of claim 22, wherein target reply signals are clustered using the calculated range of each target from the first and second transceivers.

24. The method of claim 22, wherein target reply signals are clustered using the target identification data contained in each reply signal.

25. The method of claim 22, wherein the signals are at least one of ATCRBS, Mode-S and ADS-B signals.

26. A system for correlating radar position data with target identification data comprising:
    a radar to determine radar position data of a first target;
    a first transceiver of known location for transmitting a signal to a plurality of targets, including said first target, and for receiving reply signals from said plurality of targets at said first transceiver, each reply signal including identification data about a respective target; and
    means for calculating a first round trip delay value for each of said plurality of targets using said signal transmitted from said first transceiver and said reply signals of said plurality of targets;
    means for calculating a range of each of said plurality of targets from said first transceiver using said first round trip delay value for each of said plurality of targets;
    means for establishing a first range window for each target relative to said first transceiver, said first range window being defined as a range tolerance centered around the calculated range based on said first round trip delay value;
    means for calculating a distance between said first target and said first transceiver using radar position data of said first target;
    means for comparing said calculated distance with said first range window for each of said plurality of targets to select a first range window that encompasses said calculated distance of said first target; and
    means for correlating the identification data from said target that corresponds to the selected first range window with said radar position data of said first target.

27. A system for determining a position of a target, comprising:
    first and second transceivers of known location for transmitting a signal to a plurality of targets and for receiving reply signals from said plurality of targets at said first and second transceivers, respectively, each reply signal including identification data about a respective target;
    means for calculating a first round trip delay value and a second round trip delay value for each of the plurality of targets using the transmitted signal from the first transceiver and the reply signals from the plurality of targets and the transmitted signal from the second transceiver and the reply signals from the plurality of targets, respectively;
    means for calculating a range of each target from the first and second transceivers using the first round trip delay value and the second round trip delay value for each target, respectively;
    means for establishing a first range window and a second range window for each target relative to the first transceiver and the second transceiver, respectively, said first and second range windows being defined as a range tolerance centered around the calculated range based on the first round trip delay value and the second round trip delay value for each target, respectively;
    means for clustering target reply signals received at the first transceiver with target reply signals received at the second transceiver; and
    means for comparing the first range windows and the second range windows for the targets to determine two possible positions for each of a plurality of targets based on the areas where the first and second range windows for each target overlap one another.

28. A system for determining a position of a target, comprising:
    first and second transceivers of known location for transmitting a signal to a plurality of targets and for receiving reply signals from said plurality of targets at said first and second transceivers, respectively, each reply signal including identification data about a respective target;
    means for calculating a first round trip delay value and a second round trip delay value for each of the plurality of targets using the transmitted signals from the first and second transceivers and the reply signals from said plurality of targets, respectively;
    means for calculating a range of each target from said first and second transceivers using said first round trip delay value and said second round trip delay value, respectively;

means for establishing a first range window and a second range window for each target relative to said first transceiver and said second transceiver, respectively, said first and second range windows being defined as a range tolerance centered around the calculated range based on said first round trip delay value and said second round trip delay value for each target, respectively;

means for clustering said reply signals of said plurality of targets received at said first and second transceivers;

means for determining areas where said first range window and said second range window for each target overlap one another; and means for comparing said areas of overlap with predetermined target movement area data to determine the identity and location of each target within the predetermined target movement area.

29. A system for determining a position of a target, comprising:

first, second and third transceivers of known location for transmitting signals to a plurality of targets and for receiving reply signals from said plurality of targets at said first, second and third transceivers, respectively, each reply signal including identification data about a respective target;

means for calculating a first round trip delay value, a second round trip delay value and a third round trip delay value for each of said plurality of targets using the transmitted signals from said first, second and third transceivers and reply signals from said plurality of targets, respectively;

means for calculating a range of each target from said first, second and third transceivers using said first, second and third round trip delay values, respectively;

means for establishing a first range window, a second range window and a third range window for each target relative to said first, second and third transceivers, respectively, said first, second and third range windows being defined as a range tolerance centered around the calculated range based on said first, second and third round trip delay values, respectively;

means for clustering said target reply signals received at said first, second and third transceivers;

means for determining areas where said first, second and third range windows for each target overlap one another to thereby determine the location of each target relative to said transceivers.

30. A method for a single transceiver, located proximate an airport movement area, to validate an estimated position of a target having a valid target track when radar data becomes unavailable, comprising the steps of:

estimating a position for the target based on course and speed attributes of the target and the most recent known target position;

transmitting a signal from a first transceiver of known location to the target;

receiving reply signals at the first transceiver from the target, each reply signal including identification data about the target;

using the transmitted signal from the first transceiver and the reply signals to calculate a round trip delay value for the target;

using the round trip delay value for the target to calculate a range of the target from the first transceiver;

establishing a range association window for the target relative to the first transceiver, the range association window being defined as a range tolerance centered around the calculated range based on the round trip delay value;

overlaying the range association window for the target on a map of the airport movement area;

determining at least one target position where the range association window for the target intersects a valid location on the airport movement area;

correlating the estimated position of the target with the at least one determined target positions to confirm that the estimated position correlates with one of the at least one determined target positions; and validating the estimated position of the target only when the estimated position correlates with one of the at least one determined target positions.

31. The method of claim 30, further comprising the step of updating the target track with the validated position of the target.

32. The method of claim 31, further comprising the step of communicating the validated position of the target to an end user display.

* * * * *